3,050,499
STABILIZED VINYL HALIDE RESINS
Eliot G. Gordon, New York, and Otto König, Forest Hills, N.Y., assignors to National Lead Company, New York, N.Y., a corporation of New Jersey
No Drawing.  Filed Mar. 24, 1958, Ser. No. 723,138
8 Claims.  (Cl. 260—45.7)

This invention relates to an improved vinyl halide resin composition. More particularly, this invention relates to an improved vinyl halide resin composition stabilized as to the deleterious effects of heat and light.

Vinyl halide resin compositions frequently become discolored when subjected to temperatures usually used in processing operations. Even though slight discoloration on heating may not detract to any appreciable extent from the physical properties of the resin, the discoloration seriously restricts its use in many applications. The use of these resins is further restricted due to discoloration and embrittlement which take place on exposure to light. Although many stabilizing agents have been proposed, such stabilizers have not been entirely satisfactory; particularly in preventing discoloration of vinyl halide resins under strong exposure to light and at elevated temperatures.

Recently, certain vinyl resin compositions have been developed. These vinyl resin compositions are characterized by the presence of a wide range of hydroxyl groups in the polymer. This was found to be undesirable even when as little as one hydroxyl group for 20 carbon atoms was present. It was found that the presence of hydroxyl groups in the polymer enabled the polymer to readily pick up moisture. This picking up of moisture resulted in a reduction of the clarity of clear plastics. In addition, the picking up of moisture reduced the electrical resistance of the vinyl plastic and thus severely restricted its use as an electrical insulating material.

An object of this invention, therefore, is to provide vinyl halide resin compositions resistant to yellowing during the early stages of heat exposure of said vinyl halide resin compositions. Still another object is to provide vinyl halide resin compositions resistant to yellowing during the early stages of heat exposure of said vinyl halide resin compositions, and to provide improved vinyl halide resin compositions stabilized as to the effects of heat and light. Other objects and advantages will become more apparent from the following more complete description and claims.

Broadly, this invention contemplates a vinyl halide resin composition, said vinyl halide resin being substantially free of hydroxyl groups, said composition containing as stabilizer and anti-yellowing agent therefor, at least one phosporus compound, representable by the formula $$(RO)_x PR'_y$$

wherein R represents a radical selected from the group consisting of aliphatic hydrocarbon radicals containing from 1 to 18 carbon atoms and aryl radicals containing from 6 to 18 carbon atoms, R' represents a radical selected from the group consisting of aliphatic hydrocarbon radicals containing from 1 to 18 carbon atoms and aryl radicals containing from 6 to 18 carbon atoms, $x$ is from zero to two, $y$ is from 1 to 3, and the sum of $x$ and $y$ is 3.

In a particularly desirable embodiment, this invention contemplates a vinyl halide resin composition as aforesaid, wherein R may be an aliphatic hydrocarbon radical of from 1 to 18 carbon atoms such as methyl, butyl, hexyl, 2-ethylhexyl, stearyl, oleyl, propenyl, and the like. R may also be an aryl radical of from 6 to 18 carbon atoms such as phenyl, naphthyl, docecylphenyl, and the like.

R' may be a radical selected from the group consisting of aliphatic hydrocarbon radicals containing from 1 to 18 carbon atoms and aryl radicals containing from 6 to 18 carbon atoms. Such radicals include methyl, propyl, ethenyl, oleyl, hexyl, 2-ethylhexyl, stearyl, phenyl, naphthyl, dodecylphenyl, cresyl, and the like.

While it is possible for R and R' to contain more than 18 carbon atoms and still be useful, no great advantage can be obtained therefrom and we prefer to use radicals containing no more than 18 carbon atoms.

The phosphorus compounds may be used together with metal salts that are dispersible in the vinyl resin such as cadmium 2-ethylhexoate, barium laurate, lead stearate, stannous oleate, and the like. In addition, the phosphorus compounds may be used alone without incorporating therein a metal salt. The phosphorus compounds may also be used as mixtures of two or more such compounds.

The amount of phosphorus compound used may vary widely from 0.6 to 6.0 parts of combined phosphorus per 10,000 parts of resin. Below 0.6 the phosphorus compounds do not exhibit a sufficient heat or light stabilizing effect to be of practical value, and while the amount of combined phosphorus in these compounds used may greatly exceed 6.0 parts per 10,000 parts of vinyl halide resin, no practical advantage is gained from using a phosphorus compound containing greater than 6.0 parts of combined phosphorus.

The phosphorus compounds, in addition to exhibiting a strong anti-yellowing action during the early stages of heat exposure of the polyvinyl halide, also exhibit a strong heat and light stabilizing effect on the polyvinyl halide resins under strong exposure to light and at elevated temperatures.

In order to more fully illustrate the nature of this invention and the manner of practising the same, the following examples are presented.

Example 1

A stabilizer was prepared by heating together the following ingredients at 200° F.

|  | Parts |
|---|---|
| Barium 2-ethylhexoate | 19 |
| Cadmium 2-ethylhexoate | 12 |
| Phenol | 4 |
| 2-ethylhexanol | 65 |

This composition was reserved as a control. A stabilizer composition containing an anti-yellowing agent according to this invention was prepared by heating together, in the same way, the following ingredients:

|  | Parts |
|---|---|
| Barium 2-ethylhexoate | 19 |
| Cadmium 2-ethylhexoate | 12 |
| Phenol | 4 |
| Diphenyl phenylphosphonite $C_6H_5P(OC_6H_5)_2$ | 14 |
| 2-ethylhexanol | 51 |

Two batches of vinyl resin composition were prepared, one using the control, the other using the stabilizer containing the diphenyl phenylphosphonite $C_6H_5P(OC_6H_5)_2$, according to the following formulation:

|  | Parts |
|---|---|
| Polyvinyl chloride polymer | 100 |
| Di-2-ethylhexylphthalate | 50 |
| Stabilizer anti-yellowing composition | 3 |

All parts, unless otherwise specified, are parts by weight.

The control batch was divided into several portions. One portion of the control batch was milled for 5 minutes at 340° F. This control had a brownish orange cast after the milling.

By comparison a portion of the polyvinyl chloride composition according to this invention was milled for 5 minutes at 340° F. and was substantially colorless.

A portion of the control batch and a portion of the diphenyl phenylphosphonite vinyl chloride resin composition were each calendered to clear, water white sheets of 20 mil thickness, samples of which were oven heat tested at various temperatures. After 50 minutes at 375° F., the composition containing no diphenyl phenylphosphonite, $C_6H_5P(OC_6H_5)_2$, had turned to a dark reddish brown color, whereas the composition stabilized with diphenyl phenylphosphonite, $C_6H_5P(OC_6H_5)_2$ was merely a light yellow in color. Similar tests were run at higher temperatures on 40 mil calendered sheets. After 25 minutes at 400° F., a 40 mil sheet of the control composition was dark reddish brown, whereas the phosphonite containing composition was a light yellow.

*Example 2*

The procedure of Example 1 was repeated, except that the stabilizer composition was varied twice. One stabilizer composition was composed of the following:

| | Parts |
|---|---|
| Barium 2-ethylhexoate | 19 |
| Cadmium 2-ethylhexoate | 12 |
| Phenol | 4 |
| Diphenyl phenylphosphonite, $C_6H_5P(OC_6H_5)_2$ | 2 |
| 2-ethylhexanol | 63 |

The second stabilizer composition was composed of the following:

| | Parts |
|---|---|
| Barium 2-ethylhexoate | 19 |
| Cadmium 2-ethylhexoate | 12 |
| Phenol | 4 |
| Diphenyl phenylphosphonite $C_6H_5P(OC_6H_5)_2$ | 20 |
| 2-ethylhexanol | 45 |

Both vinyl chloride compositions were subjected to the same tests as in Example 1, and were compared against a control as in Example 1. The control had a brownish orange cast after milling for 5 minutes at 340° F. Then vinyl chloride composition in which was incorporated the stabilizer composition containing two parts of the diphenyl phenylphosphonite was substantially colorless after milling for 5 minutes at 340° F. The second vinyl chloride composition in which was incorporated the stabilizer composition containing 20 parts of the diphenyl phenylphosphonite, exhibited no evidence of discoloration.

In addition, a portion of the control composition was subjected to the oven heat test as described in Example 1 and turned to a dark reddish brown color. The vinyl chloride resin composition in which was incorporated the stabilizer composition containing 2 parts of the diphenyl phenylphosphonite was also subjected to the oven heat test of Example 1, and was merely a dark yellow in color, and the vinyl chloride composition in which was incorporated the stabilizer composition containing 20 parts of the diphenyl phenylphosphonite was light yellow in color after being subjected to the oven heat test as described in Example 1.

*Example 3*

The procedure of Example 1 was repeated several times, except that the phosphonite used in preparing the stabilizer composition was varied each time on an equivalent combined phosphorus content, equivalent to the combined phosphorus content of the phosphonite used in Example 1. Among the phosphonites used were dimethyl phenylphosphonite $C_6H_5P(OCH_3)_2$, distearyl butylphosphonite $$C_4H_9P(OC_{18}H_{37})_2$$

di(dodecyl phenyl) naphthyl phosphonite $$C_{10}H_7P(OC_{18}H_{29})_2$$

dicresyl phenylphosphonite $C_6H_5P(OC_7H_7)_2$, di 2-ethylhexyl phenylphosphonite $C_6H_5P(OC_8H_{17})_2$, dibutyl phenylphosphonite $C_6H_5P(OC_4H_9)_2$, and P-ethyl, P-phenyl phenylphosphonite

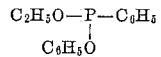

In each and every case, the vinyl chloride resin composition containing the phosphonite exhibited a much stronger anti-yellowing effect than the control, and a much greater stabilization effect against the action of heat and light than the control.

*Example 4*

A vinyl chloride composition was made up as follows:

| | Parts |
|---|---|
| Vinyl chloride resin | 100 |
| Di-2-ethylhexyl phthalate | 50 |
| Stearic acid | 0.5 |
| Diphenyl phenylphosphonite | 3.0 | based on the weight of the combined phosphorus.

A control was also prepared exactly as above, except that no diphenyl phenylphosphonite was therein incorporated. Both the control batch and the vinyl chloride composition according to this invention were divided into several portions, and a portion from each batch was milled at 300° F. for 3, 5, 7, and 10 minutes. After 3 minutes, the control composition had turned yellow, whereas the vinyl chloride composition according to this invention was colorless. After 10 minutes of milling at 300° F., the control composition was brownish orange, whereas the vinyl chloride composition according to this invention was merely a light yellow. In addition, it was discovered that the vinyl halide composition according to this invention exhibited a lubricating action as evidenced by the fact that there was a slight sticking of the control composition to the mill after milling for 5 minutes at 300° F. The sticking of the control composition was quite pronounced after 10 minutes at 300° F., rendering it difficult to remove it from the mill, and resulting in the marring of the plastic sheet.

The vinyl chloride composition according to this invention however, showed no evidence of sticking to the mill at any time and was unmarred.

*Example 5*

The procedure of Example 4 was repeated, except that the 100 parts of vinyl chloride resin was replaced by a copolymer of 95 parts of vinyl chloride and 5 parts of vinyl acetate. This copolymer is known as VYNW. The milling procedure of Example 4 was again repeated, except that the temperature was 275° F. After 3 minutes, the control composition had turned yellow, whereas the copolymer composition according to this invention was colorless. After 10 minutes, the control composition was a light orange and the copolymer composition according to this invention was merely a light yellow.

*Example 6*

The procedure of Example 1 was repeated, except that the resin used was a copolymer of 95 parts vinyl chloride and 5 parts vinyl acetate known as VYNW. Results, identical to the results of Example 1 were obtained.

*Example 7*

The procedure of Example 1 was repeated several times, except that each time, an equivalent amount of one of the following compounds was substituted for the barium 2-ethylhexoate. Among the compounds used were: magnesium laurate, calcium stearate, and strontium oleate. Results, similar to the results of Example 1 were obtained in this example.

*Example 8*

The procedure of Example 1 was repeated several times, except that each time, an equivalent amount of one of the following compounds was substituted for the cadmium 2-ethylhexoate. Among the compounds used were cadmium benzoate and zinc 2-ethylhexoate. Results similar to the results of Example 1 were obtained in this example.

*Example 9*

The procedure of Example 1 was repeated several times, except that each time, an equivalent amount of one of the following compounds was substituted for both the cadmium 2-ethylhexoate and barium 2-ethylhexoate. Among the compounds used were lead stearate, and stannous oleate. Results similar to the results of Example 1 were obtained in this example.

*Example 10*

The procedure of Example 1 was repeated several times, except that a phosphinite was used in place of the phosphonite used in Example 1. The phosphinite was substituted for the phosphonite of Example 1 on an equivalent combined phosphorus content, equivalent to the combined phosphorus content of the phosphonite used in Example 1. Among the compounds used were phenyl diphenylphosphinite $(C_6H_5)_2P$—$OC_6H_5$, dodecylphenyl diethylphosphinite $(C_2H_5)_2P$—$OC_{18}H_{29}$, butyl distearylphosphinite $(C_{18}H_{37})_2P$—$OC_4H_9$, and phenyl P-ethyl, P-phenylphosphinite

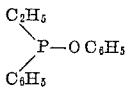

In each case, the phosphinite exhibited a strong antiyellowing effect as compared to the control, and in addition the phosphinites exhibited a high stabilizing action against the deleterious effects of heat and light, as compared to the control.

*Example 11*

The procedure of Example 1 was repeated several times, except that a phosphine was used in place of the phosphonite used in Example 1. The phosphine was substituted for the phosphonite of Example 1 on an equivalent combined phosphorus content, equivalent to the combined phosphorus content of the phosphonite used in Example 1. Among the compounds used were triphenylphosphine $(C_6H_5)_3P$, dimethyl phenylphosphine $$(CH_3)_2P—C_6H_5$$

distearyl butylphosphine $(C_{18}H_{37})_2P$—$C_4H_9$, and P-ethyl-P-dodecylphenyl butylphosphine

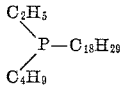

In each case, the phosphines exhibited a strong anti-yellowing effect as compared to the control, and in addition the phosphines showed a high stabilizing action against the deleterious effects of heat and light, as compared to the control.

*Example 12*

The procedure of Example 1 was repeated, except that an additional phosphonite was used together with the phosphonite used in Example 1. The combined phosphorus content of the two phosphonites used in this example was equal to the total combined phosphorus content of the phosphonite used in Example 1. The two phosphonites used in this example, the amount of combined phosphorus in each phosphonite being equal to one another, were diphenyl phenyl phosphonite $$C_6H_5P(OC_6H_5)_2$$

and dicresyl phenylphosphonite $C_6H_5P(OC_7H_7)_2$. Results similar to the results of Example 1 were obtained.

*Example 13*

The resin composition powder of Example 1 was compression molded into several articles, such as a pair of plastic rain boots, an identification disk, and a phonograph record blank.

The procedure for the compression molding was as follows:

(1) The mold was preheated and the vinyl chloride resin composition was put in the lower half of the mold.

(2) The mold was slowly closed until the material began to flow, at which time the rate of closing of the mold was slowed down to nearly an imperceptible speed. After the excess material had flashed out and the upper part of the mold was seated on the cut off areas of the lower half of the mold, the mold was allowed to remain closed for a definite period of time.

(3) The mold was then opened and the piece ejected hot, by an air blast.

(4) The molded article was then defined and buffed.

The vinyl chloride resin composition was used to make a wide variety of articles via injection molding, casting, compression molding, and in addition, the resin was extruded, and was calender milled into sheets. The milling and extruding enable the producer of the resin composition to supply the manufacturer of various articles with a convenient form of the resin composition ready for processing into the finished article.

The vinylhalide resin composition of this invention results in improved clarity of the processed composition and in a processed composition which shows a great degree of stability as against the deleterious effects of heat and light. In addition, the vinylhalide resin composition of this invention exhibits a great degree of resistance to yellowing during both the initial and later stages of heat exposure during the processing of the said composition, and the phosphorus containing compounds of this invention have, in many cases, been found to be excellent lubricants.

While this invention has been described in terms of certain preferred embodiments and illustrated by means of specific examples, these are illustrative only, and the invention is not to be construed as limited, except as set forth in the following claims.

We claim:

1. A vinyl halide polymer composition, said vinyl halide polymer being substantially free of hydroxyl groups, said polymer being selected from the group consisting of vinyl chloride and copolymers of vinyl chloride with vinyl acetate said composition containing as stabilizer and anti-yellowing agent therefor, at least one phosphorus compound, representable by the formula $(RO)_xPR'_y$, wherein R represents a radical selected from the group consisting of aliphatic hydrocarbon radicals containing from 1 to 18 carbon atoms and aryl radicals containing from 6 to 18 carbon atoms, R' represents a radical selected from the group consisting of aliphatic hydrocarbon radicals containing from 1 to 18 carbon atoms and aryl radicals containing from 6 to 18 carbon atoms, $x$ is from zero to 2, $y$ is from 1 to 3, and the sum of $x$ and $y$ is 3, said phosphorus compound being present in amounts equivalent from about 0.6 to about 6.0 parts of combined phosphorus per 10,000 parts of vinyl halide polymer.

2. A vinyl halide polymer composition according to claim 1, containing a metal salt therein.

3. A vinyl halide polymer composition according to claim 1 in which said vinyl halide polymer is a copolymer of a vinyl chloride monomer with vinyl acetate.

4. A vinyl halide polymer composition according to claim 1, wherein said phosphorus compound is diphenyl phenylphosphonite.

5. A vinyl halide polymer composition according to claim 1, wherein said phosphorus compound is di-2-ethylhexyl phenylphosphonite.

6. A vinyl halide polymer composition according to claim 1, wherein said phosphorus compound is phenyl diphenylphosphinite.

7. A vinyl halide polymer composition according to claim 1, wherein said phosphorus compound is triphenyl phosphine.

8. A vinyl halide polymer composition according to claim 1, wherein said phosphorus compound is dibutyl phenylphosphonite.

References Cited in the file of this patent

UNITED STATES PATENTS

| | | |
|---|---|---|
| 2,516,980 | Gray et al. | Aug. 1, 1950 |
| 2,867,594 | Hansen et al. | Jan. 6, 1959 |
| 2,946,764 | Joy et al. | July 26, 1960 |

FOREIGN PATENTS

| | | |
|---|---|---|
| 915,984 | Germany | Aug. 2, 1954 |